No. 871,571. PATENTED NOV. 19, 1907.
J. F. DELANY.
SHAKING SIEVE.
APPLICATION FILED JAN. 18, 1907.
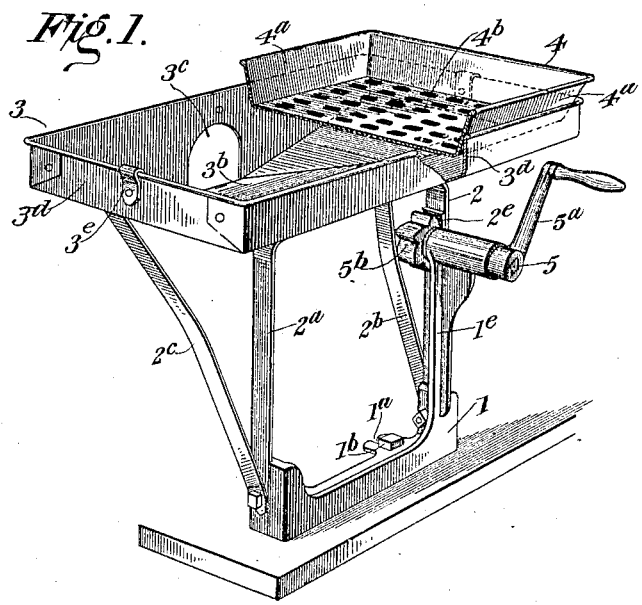
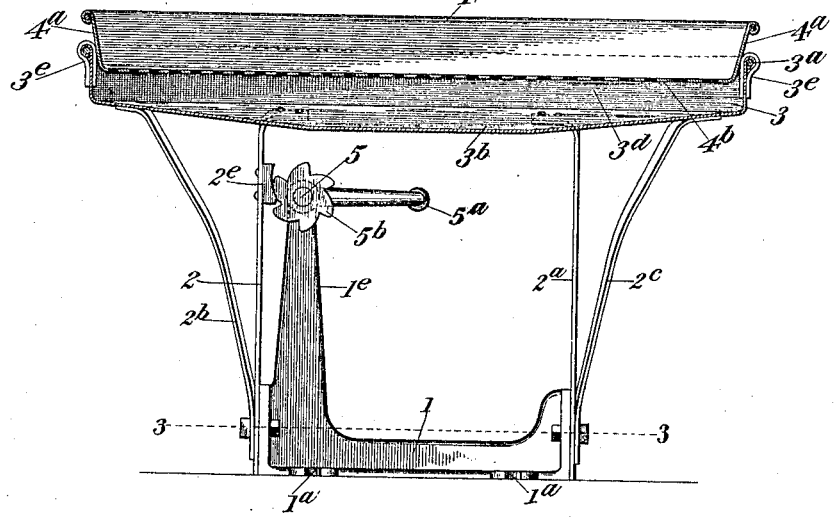
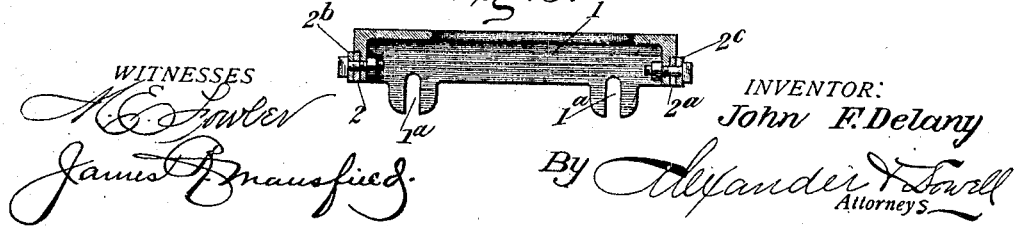
WITNESSES
INVENTOR:
John F. Delany
By Alexander Powell
Attorneys

UNITED STATES PATENT OFFICE.

JOHN F. DELANY, OF COLONA, ILLINOIS.

SHAKING-SIEVE.

No. 871,571.      Specification of Letters Patent.      Patented Nov. 19, 1907.

Application filed January 18, 1907. Serial No. 352,981.

To all whom it may concern:

Be it known that I, JOHN F. DELANY, of Colona, in the county of Henry and State of Illinois, have invented certain new and useful Improvements in Shaking-Sieves; and I hereby declare that the following is a full, clear, and exact description thereof, reference being had to the accompanying drawings, which form part of this specification.

This invention is an improvement in shaking sieve operating devices, and its object is to provide an efficient, compact and simple mechanism for shaking the sieves, instead of shaking them by holding them in the hands.

By this invention the sieves can be given a more uniform sieving motion, and the manual labor of sieving is reduced to the minimum, and may be entirely obviated if the knocker driving shaft be connected with a motor or other suitable power driven device.

The invention is particularly designed for use in connection with test-sieves, such as are used by grain buyers and millers, but it is also useful for operating hand sieves designed for sorting, cleaning and grading grain for seed; and it is also applicable for use in operating hand sieves in bakeries and the like.

In the drawings I have illustrated a complete, and the at present preferred, machine embodying the invention, and will now describe the same in detail, and summarize the essential parts and features of the invention for which protection is desired, in the claims following the specifications.

In said drawings—Figure 1 is a perspective view of the complete machine with the sieve removed. Fig. 2 is a sectional elevation thereof. Fig. 3 is a detail.

The machine has a base-piece 1 which may be provided with slots $1^a$ for engagement of fastening bolts $1^b$ by which it can be fastened to a table or other suitable support. To the base are fastened the lower ends of two spring uprights 2, $2^a$, which are preferably curved inwardly at their upper ends and bolted or otherwise secured to the under side of a sieve supporting pan or hopper 3; which hopper is further upheld in horizontal position, relatively to the base, by means of inclined brace-springs $2^b$, $2^c$, as shown. This hopper 3 is preferably formed of sheet metal, and is approximately pan-shaped, and its upper edge may be strengthened by a wire $3^a$, or in other suitable manner. Its bottom $3^b$ is hopper-shaped, inclining from both ends and one side toward an outlet opening $3^c$ in the side of the hopper furthest removed from the base. The vertical side walls $3^d$ of the hopper form a support and retainer for sieves 4, which are removably placed thereon or therein.

Preferably the sieves 4 are formed of sheet metal, and are pan-like in form, having imperforate sides $4^a$, and perforated or foraminous bottoms $4^b$, the perforations in the bottoms being of any desired size and shape.

For sorting grain a set of changeable sieves are provided of different mesh or size, so as to grade the material properly. The pan-like sieves 4 are slightly smaller than the pan-like portion of the hopper, so that a sieve can be set over and partly in the hopper, as indicated in the drawings, and will be securely held and supported by such hopper, and upheld a sufficient distance above the bottom of the hopper to allow the screenings to readily escape through the sieve into the hopper and be discharged through the openings $3^c$.

The vertical sides of the hopper may be provided with pieces of leather, or other suitable material, as shown at $3^e$, which serve both to maintain a close fit between the walls of the hopper and sieve, and also to deaden noise and prevent the sieves rattling in the hopper.

The base 1 is provided with a standard $1^c$ near one end, in the upper end of which is formed a bearing for a shaft 5, having a handle $5^a$ on its outer end, and a knocker-cam or eccentric $5^b$ on its inner end; which knocker may be formed integral with the shaft if desired. The knocker $5^b$ stands in position to be pressed against by the spring 2 when the hopper is in normal position, and consequently when the shaft is rotated the projections on the knocker will successively strike the spring and move it away from the shaft, thus moving the hopper in one direction, while the springs return it in the opposite direction. The spring 2 may be provided with a rubbing-plate or cam $2^e$ of raw-hide or other suitable material to engage the knocker, and when the projections on the knocker clear the cam $2^e$ the hopper is moved back by the springs.

Operation. After the base is bolted in place, the sieve that is to be used is placed on the hopper, thus closing the top thereof as shown—but leaving a space between its bottom and the hopper-bottom sufficient for discharging the screenings. The material to be separated having been placed in the sieve, the operator turns handle 5ᵃ, thereby rapidly vibrating the hopper and screen and the smaller particles will all be discharged through the screen and hopper, while the larger portions will be retained in the sieve, and by removing the sieve the material can be dumped wherever desired by tipping the sieve. While in my machine the sieves are in the form of a pan formed of one piece of metal and having the bottom perforated and are not attached in any manner to the shaking shoe or hopper tray which takes the place of the ordinary shoe, thus making it easy to instantly change the sieves to perform the different parts of the separating process. The ratchet eccentric or knocker operates against one side of the arched spring below the shoe, and is arranged in this manner to avoid the harsh positive movement that is imparted to a shoe or shaker when the eccentric is directly connected therewith. By having the shaking hopper actuated by the knocker operating against the spring, a smooth vibration is obtained which could not be obtained in the ordinary manner.

Having the sieves or trays entirely disconnected from the hopper and being shaken by simply placing them on top of the shaking hopper is a novel feature. I am aware that ratchet eccentrics are used in many kinds of sieving devices but always against the sieve or shoe.

In my device I place the knocker so it will operate on the spring between the point where the spring is attached to the base and where it is attached to the hopper thus obtaining a lively springing motion.

Having described my invention what I claim as new and desire to secure by Letters Patent is:

1. In a sieve operating machine, the combination of a base, a hopper-shaped pan, spring uprights and inclined braces supporting the pan on the base, a knocker-cam adapted to engage one of the spring uprights at a point below the pan, and means for rotating said knocker.

2. In a sieve operating machine, the combination of a base, a pan having a hopper-shaped bottom, upright springs and inclined braces supporting the pan on the base, and means for vibrating said pan; with a removable sieve adapted to be placed in the pan.

3. In a sieve operating machine, the combination of a base, a hopper-shaped pan, spring uprights and inclined braces supporting the pan on the base, a knocker-cam adapted to engage one of the spring uprights at a point below the pan, and means for rotating said knocker; with a removable pan-like sieve adapted to be placed in the hopper.

4. In a sieve operating machine, the combination of a base, provided with a standard; a rotatable shaft journaled in said standard, a knocker on said shaft, a hopper having a discharge opening at one side, upright springs connected to the base and hopper, one of said springs engaging the knocker, and inclined brace springs also connected to the base and hopper.

5. In a sieve operating machine, the combination of a base, provided with a standard; a rotatable shaft journaled in said standard, a knocker on said shaft, a hopper having a discharge opening at one side, upright springs connected to the base and hopper, one of said springs engaging the knocker, and inclined brace springs also connected to the base and hopper; with a removable pan-like sieve adapted to be placed in the hopper, and means for preventing rattling of the sieve in the hopper.

In testimony that I claim the foregoing as my own, I affix my signature in presence of two witnesses.

JOHN F. DELANY.

Witnesses:
HARRY KOHLMORGAN,
ALBERT HALL.